Patented June 28, 1949

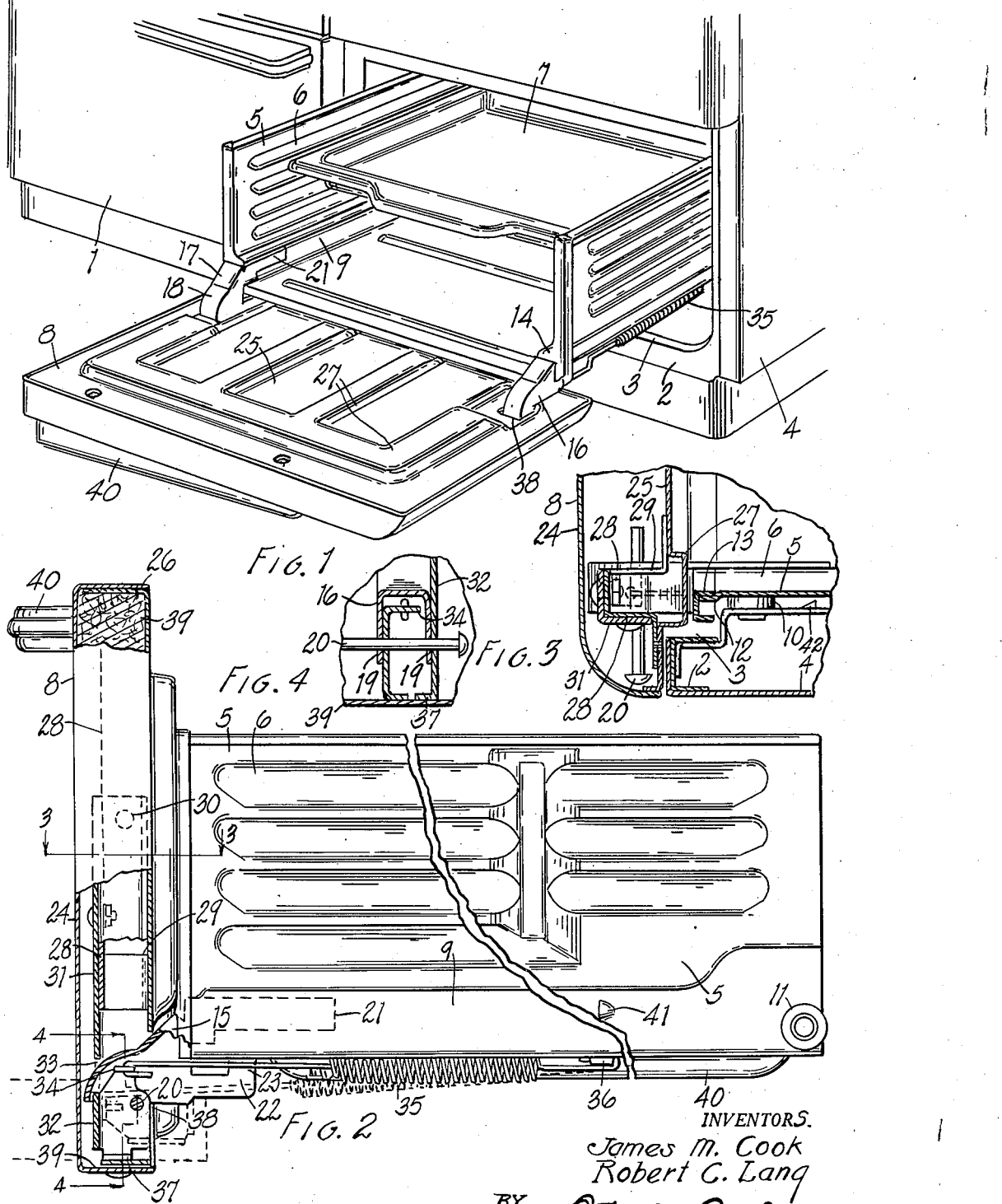

2,474,225

UNITED STATES PATENT OFFICE 2,474,225

COOKING STOVE BROILER AND DOOR ASSEMBLY

James M. Cook and Robert C. Lang, Kalamazoo, Mich., assignors to Kalamazoo Stove and Furnace Company, Kalamazoo, Mich.

Application August 12, 1946, Serial No. 689,963

9 Claims. (Cl. 126—41)

This invention relates to improvements in cooking stove broiler and door assembly.

First, to provide a broiler and door assembly for a cook stove which will be both sturdy and easily cleaned.

Second, to provide a door hinge structure for a cook stove boiler or the like which is easy to assemble and which effectively distributes the load of the door over a substantial portion of the broiler body.

Third, to provide a withdrawable assembly for a cook stove with a door which is pivoted on the assembly and counter-balanced by readily accessible but concealed springs.

Fourth, to provide a withdrawable unit and compartment door for a cook stove in which the unit may be withdrawn from the chamber and the door opened with a single motion.

Other objects relating to details and economies of the invention will appear from the description to follow. The invention is defined and pointed out in the claims.

The drawings, of which there is one sheet, illustrate a preferred form of the broiler assembly.

Fig. 1 is a fragmentary perspective view of a cooking stove showing the broiler body and door in open position.

Fig. 2 is a side elevational view partially broken away, of the broiler body and door shown in Fig. 1.

Fig. 3 is a fragmentary cross-sectional view on the plane 3—3 in Fig. 2.

Fig. 4 is a fragmentary cross-sectional view on the broken planes 4—4 in Fig. 2.

Fig. 1 represents a cook stove 1 provided with a front frame member 2 defining an opening 3 into a broiler chamber, the side of which is closed by the side panel 4. A broiler body 5 of generally U-shaped cross-section is provided with inwardly pressed ribs 6 arranged to support a broiler pan 7 and is further arranged to slide in and out of the broiler chamber opening as will be more particularly described presently. A door generally indicated at 8 is mounted on the broiler body and arranged to close the broiler chamber opening and form a substantially flush surface with the remainder of the front of the stove.

The U-shaped broiler body 5 is offset or stepped inwardly as at 9 along its lower side edges to form rails arranged to rest at their forward ends on the rollers 10 secured to the body of the stove (see Fig. 3). Other rollers 11 are secured to the rear ends of the stepped portions and arranged to roll on suitable rails in the broiler chamber which are not shown. The broiler assembly is thus slidable in and out of the broiler chamber through the opening 3.

The forward edge of the broiler body is offset outwardly as at 12 (see Fig. 3) and reinforced by a generally U-shaped front member 13 which is of rearwardly opening U-shaped cross-section and is secured to the broiler body by having its inner flange welded to the offset portion 12. The front member 13 is enlarged at its lower corner as at 14 to fit over the stepped portions 9 of the broiler body. The web portion of the front member 13 is cut away as at 15, opposite each of the stepped portions and pressed upwardly to mate with the edge of fixed hinge brackets 16. The hinge brackets 16 are of generally U-shaped cross-section and are provided with forwardly sloping portions 17, the upper edge of which mate with the broiler front member as just explained, and the lower portions of which are formed in arcuate sections 18. The lower edges of the arcuate sections have the ears 19 (see Fig. 4) formed thereon at the center of the curvature thereof and define apertures for receiving the hinge pins 20.

The inner or opposed sides of the two hinge brackets 16 have attaching flanges 21 extending inwardly of the broiler body and welded to the inside of the stepped portions 9. Other inwardly extending flanges 22 formed on the bottom inner sides of the hinge brackets extend underneath the broiler front member and are provided with upwardly extending ears 23 engaging the bottom of the broiler body member. The rear ends of the flanges 21 are cut away at the bottom to permit the hinges to be tipped up to slide the lower flanges and ears 23 under the front member 13 and still have the hinges engage both the top and bottom of the body when installed.

The door 8 consists of an outer panel 24 and an inner panel 25, each of which is formed as stampings with nesting flanges 26 around the edges thereof, which are arranged to be secured together by screws in the well known stove construction manner. The inner panel 25 is embossed to have the stiffening ribs 27 formed thereon and extending inwardly of the broiler. Attached to the end stiffening ribs on the forward side thereof so as to be located between the two door panels, are two channel members 28 provided with out-turned flanges on their edges which are welded to the inner panel 25 on either side of the end stiffening ribs. The opposed or adjacent sides of the two channel members 28 are cut away as at 29 (see Fig. 2) to permit easy access to the holes 30 formed in the outer flanges.

The channel members 28 thus rigidly secured to the inner door panel serve to support the angle shaped attaching brackets 31 which are secured thereto by bolts extending through the holes 30.

The attaching brackets 31 are provided with a lower portion 32 of channel-shaped cross-section and which is arranged to fit against the outer sides of each wall of the arcuate portions 18 of the fixed hinge members 16. The channel-shaped portion of the bracket 32 has its side flanges pierced to receive the pivot pin 20 and secure the door to the broiler body. The web of the attaching bracket is slotted as at 33 to clear the forward edge of the fixed hinge member and the upper inside edge of the channel portion 32 is folded outwardly of the door as at 34 and pierced to form an attaching flange for the forward end of the coil spring 35. The opposite ends of the coil springs are secured to clips 36 on the bottom of the broiler body member so that the springs act to balance the weight of the door in open position and to urge the door to closed position at all times, except when the door is in fully open position and the flanges 34 are aligned with the pins 20 and the clips 36. The lower edges of the channel sections 32 are also bent inwardly to form ears 37 which are engageable with the lower flange on the inner door panel. The bottom of the inner door panel is arranged to abut in open position of the door against the lower edges of the flanges 22 on the fixed hinge members. The flanges 22 thus act as stops to limit the opening movement of the door.

The inner panel 25 is apertured at each side at 38 to pass the fixed hinge members 16 so that the connections between the fixed hinge members and the mounting bracket 31 are concealed when the door is open and so that the door and broiler present a neat, clean appearance when opened. The springs 35 are further concealed underneath the broiler.

After the mounting brackets 31 and the springs 35 have been connected to the inner panel 25 of the door and the panel connected to the broiler body by the pins 20 as just explained, the two door panels may be joined together to complete the broiler body and door assembly. Suitable insulating material 39 may be positioned between the door panels. A suitably designed handle 40 is secured to the door 8.

Ears 41 are pressed outwardly of the sides of the broiler body to form stops engageable with similar stops 42 formed on the inside frame members of the stove. The stops 41 and 42 are so located that the broiler back may be drawn out of the stove sufficiently to expose the contents of the broiler pan but not far enough to run the rollers 11 off their rails. The springs 35 are strong enough to resist any swinging action of the door on its pivots until the broiler body is far enough to engage the stop. Further pull on the handle 40 will swing the door 8 downwardly to the horizontal position shown in Fig. 1.

From the above description it should be apparent that the broiler body, together with its boiler pan, may be easily withdrawn from the broiler chamber of the stove by simply pulling on the handle of the broiler door. The single pulling action on the door will also fold the door downwardly away from the front of the broiler body, thus leaving the broiler pan freely exposed and permitting easy tending of any food being cooked therein. The fixed hinge members 16 may be given an enamel finish at the same time as the broiler body and act to rigidly support the door in both open and closed position without further links or braces.

The springs 35 are connected to the door so that when the door is in its fully open horizontal position the pull of the springs acts to hold the door in that position. However, the springs act to lift the door to its upright position as soon as its outer end is lifted.

We have illustrated and described our invention as embodied in a broiler structure. It may be embodied in oven structures where it is desired to withdraw the racks or supports for the material to be cooked to facilitate the placing of material or the removal of the material or other manipulation thereof.

A highly satisfactory commercial embodiment of the invention has been herein illustrated and described. No attempt has been made to show other possible adaptations as it is believed this disclosure will enable those skilled in the art to embody or adapt the invention as may be desired.

Having thus described the invention what is claimed as new and desired to secure by Letters Patent is:

1. A hinge structure for a broiler and door assembly comprising fixed hinge members having a downwardly opening channel-shaped cross-section, flanges extending from the inner rear sides of said hinge members and secured to the inner sides of said broiler, other flanges spaced below said first flanges and abutting against the under side of said broiler, an inner panel for said door defining a pair of apertures arranged to pass the front ends of said fixed hinge members, stiffening ribs of channel shaped cross-section secured to the forward side of said panel, one flange of said ribs being partially cut away, attaching brackets secured to said ribs and having rearwardly opening channel shaped lower portions extending therebelow in lapping relationship with the sides of said fixed hinge members, the lower portions of said brackets and said hinge members defining apertures whereby a pivot pin may be passed therethrough, ears turned inwardly of the channel shape of said lower portions above said apertures in the closed position of said door, and tension springs extending between said ears and said broiler and extending underneath said fixed hinge members, said lower portions of said attaching brackets being cut away on the forward side thereof to pass the forward ends of said fixed hinge members.

2. A hinge structure for a broiler and door assembly comprising fixed hinge members having a downwardly opening channel-shaped cross-section, flanges extending from the inner rear sides of said hinge members and secured to the inside of said broiler, other flanges spaced below said first flanges and abutting against the under side of said broiler and forming stops for limiting the opening movement of said door, an inner panel for said door defining a pair of apertures arranged to pass the front ends of said fixed hinge members, stiffening ribs of channel shaped cross-section secured to the forward side of said panel, attaching brackets secured to said ribs and extending therebelow in lapping relationship with the sides of said fixed hinge members, and pivot pins passed through said lower portions and said fixed hinge members.

3. A hinge structure for attaching a broiler chamber door to a broiler body comprising fixed hinge members having vertically spaced rearwardly extending flanges arranged to be secured to said broiler above and below the bottom wall thereof, an inner panel for said door defining a pair of apertures adapted to receive the forward ends of said hinge members, attaching brackets secured to the forward side of said panel and having lower portions of channel-shaped cross section defining pivot pin openings, pivot pins extending through said openings and the forward portions of said fixed hinge members, the webs of said lower portions being cut away whereby the forward ends of said hinge members may pass thereover, and tension springs connected between said broiler and said attaching bracket and extending underneath said fixed hinge members.

4. A hinge structure for attaching a broiler chamber door to a broiler body comprising fixed hinge members having vertically spaced rearwardly extending flanges arranged to be secured to said broiler above and below the bottom wall thereof, an inner panel for said door defining a pair of apertures adapted to receive the forward ends of said hinge members, attaching brackets secured to the forward side of said panel and having lower portions of channel-shaped cross section defining pivot pin openings, and pivot pins extending through said openings and the forward portions of said fixed hinge members, the webs of said lower portions being cut away whereby the forward ends of said hinge members may pass thereover.

5. A hinge structure for attaching a broiler chamber door to the broiler body of a cook stove comprising fixed hinge members having downwardly and rearwardly opening channel-shaped cross section, the upper rear edges of said members being arranged to abut against the forward end of said broiler at the sides thereof, vertically spaced flanges extending rearwardly from the inner rear edges of said hinge members and secured to said broiler above and below the bottom wall thereof, the lower of said flanges forming a stop to limit opening movement of the door, and means carried by said door for pivotally mounting said door on the forward ends of said fixed hinge members.

6. A hinge structure for attaching a broiler chamber door to the broiler body of a cook stove, comprising fixed hinge members having a downwardly and rearwardly opening channel-shaped cross section, the upper rear edges of said members being arranged to abut against the forward end of said broiler at the sides thereof, vertically spaced flanges extending rearwardly from the inner rear edges of said hinge members and secured to said broiler above and below the bottom wall thereof, and means carried by said door for pivotally mounting said door on the forward ends of said fixed hinge members.

7. In combination with a cooking stove having a broiler chamber opening to the front thereof, a broiler body of general U-shaped cross section slidable through said opening, said body having inwardly stepped ribs along the lower side edges thereof, fixed hinge members secured to the front ends of said ribs and having forwardly extending arcuate portions of downwardly opening channel shaped cross section, a broiler chamber door having an inner panel defining apertures to receive said arcuate portions and pivoted thereto on the forward side of said panel, and spring members secured between said broiler body and said inner door panel and extending under said ribs and said arcuate portions to urge said door toward closed position, said springs being connected to said door so as to approximately intersect the axis of the pivots in the open position of said door.

8. In combination with a cooking stove having a broiler chamber opening to the front thereof, a broiler body slidable through said opening, said body having inwardly stepped ribs along the lower side edges thereof, fixed hinge members secured to the front of said ribs and having forwardly extending arcuate portions of channel shaped cross section, fingers extending from the inner sides of said hinge members and secured to said body on the sides of said ribs, a broiler chamber door having an inner panel defining apertures to receive said arcuate portions and pivoted thereto on the forward side of said panel, and tension spring members secured between the under side of said broiler body and said inner door panel to urge said door toward closed position.

9. In combination with a cooking stove having a broiler chamber opening to the front thereof, a broiler body of general U-shaped cross-section slidable through said opening, fixed hinge members secured to the lower side edges of said broiler body at the front thereof and having forwardly extending arcuate portions of downwardly opening channel shaped cross section, a double walled broiler chamber door having an inner panel pivoted on said arcuate portions at points within said door, said inner panel defining apertures to receive said arcuate portions, and spring members secured between said broiler body and said inner door panel and extending under said arcuate portions to urge said door toward closed position.

JAMES M. COOK.
ROBERT C. LANG.

REFERENCES CITED

The following references are of record in the file of this patent:

UNITED STATES PATENTS

| Number | Name | Date |
|---|---|---|
| 2,029,718 | Hobson et al. | Feb. 4, 1936 |
| 2,119,898 | Weston | June 7, 1938 |
| 2,208,871 | Rogers | July 23, 1940 |

FOREIGN PATENTS

| Number | Country | Date |
|---|---|---|
| 360,248 | Great Britain | Nov. 5, 1931 |